Jan. 28, 1936.  B. S. HYATT  2,029,074
ATTACHMENT FOR TYPEWRITERS
Filed Aug. 29, 1933   6 Sheets-Sheet 1

B. S. Hyatt
Inventor

By ..........
Attorneys.

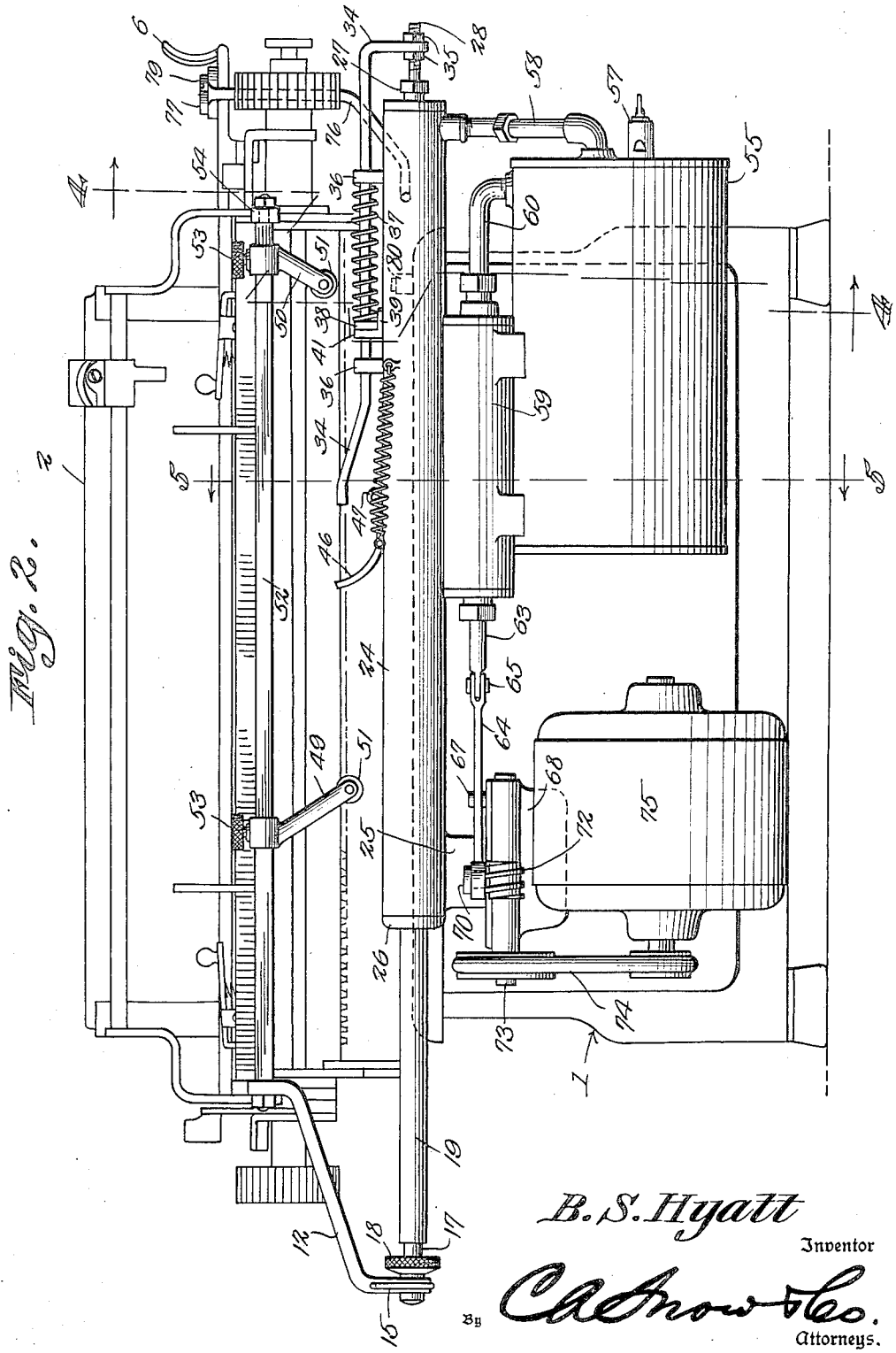

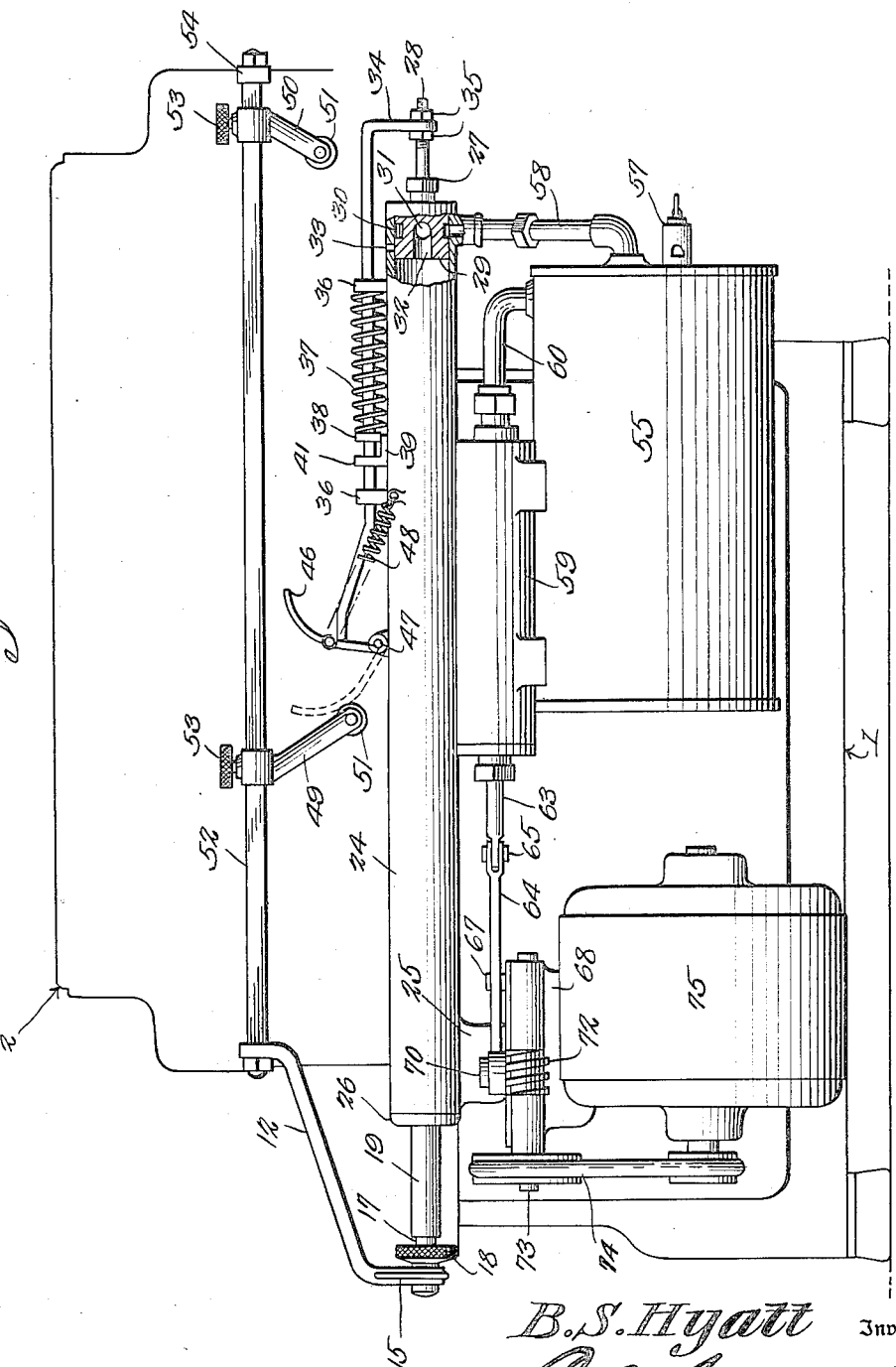

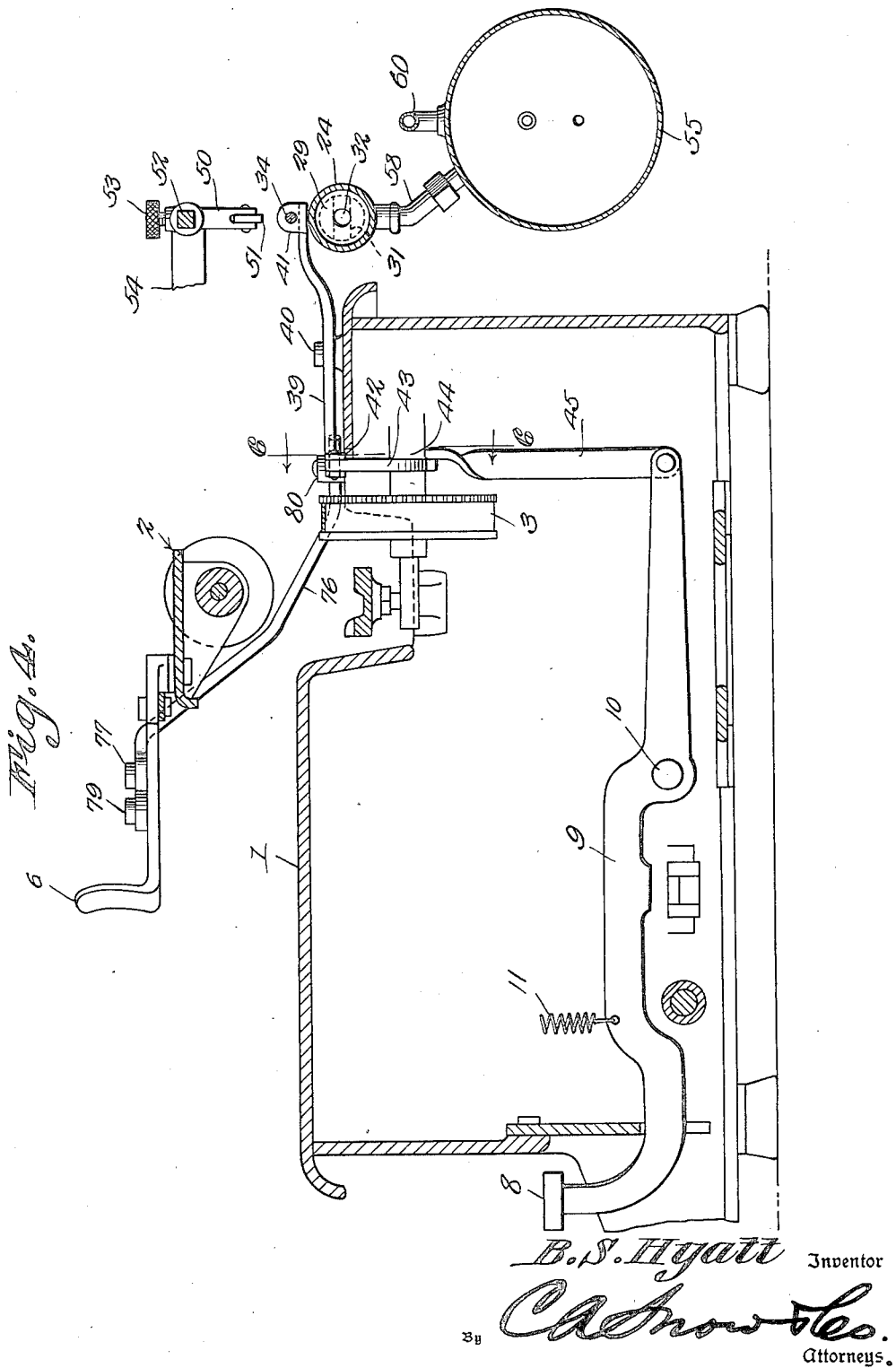

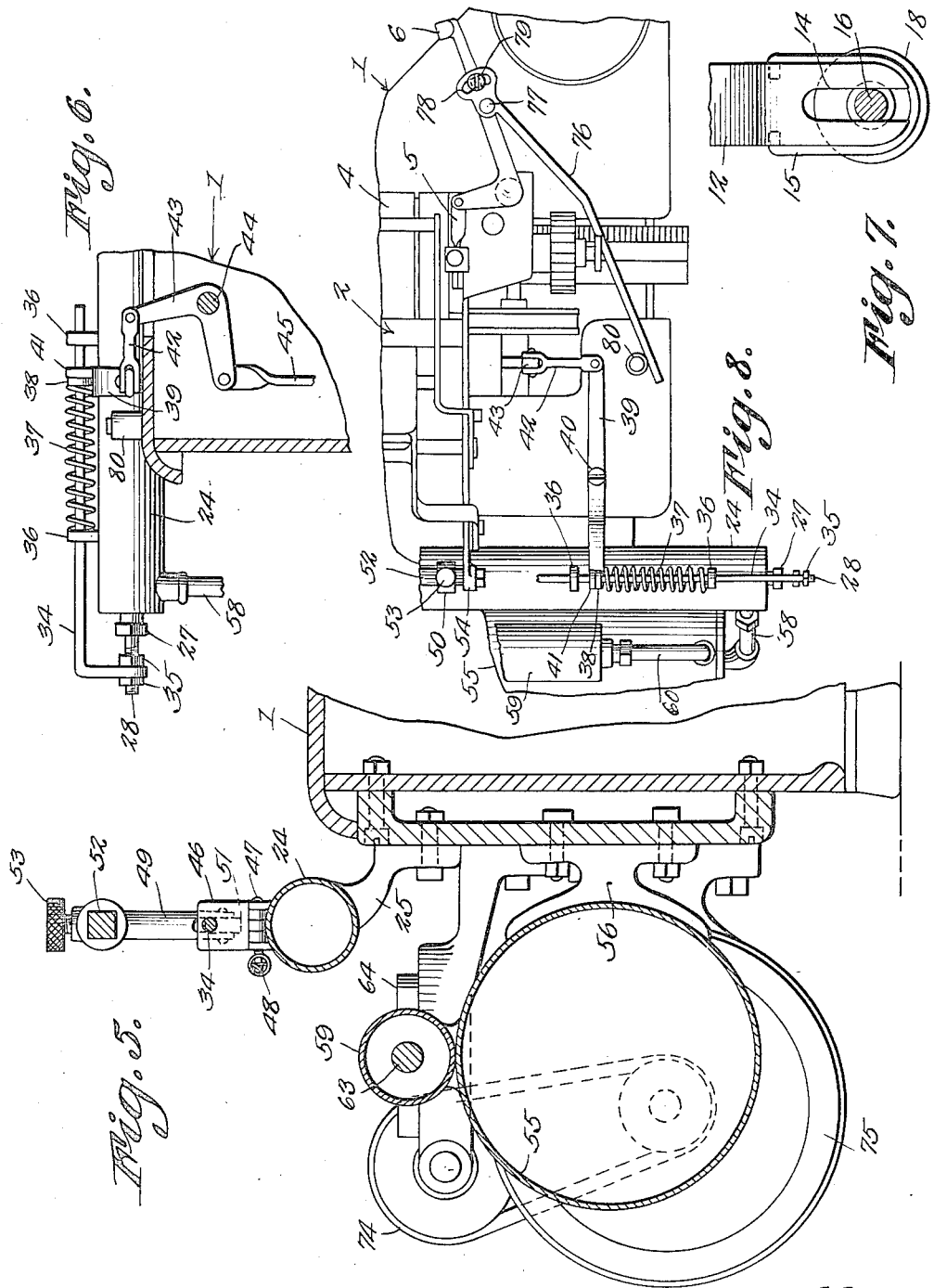

Jan. 28, 1936.  B. S. HYATT  2,029,074
ATTACHMENT FOR TYPEWRITERS
Filed Aug. 29, 1933  6 Sheets-Sheet 6
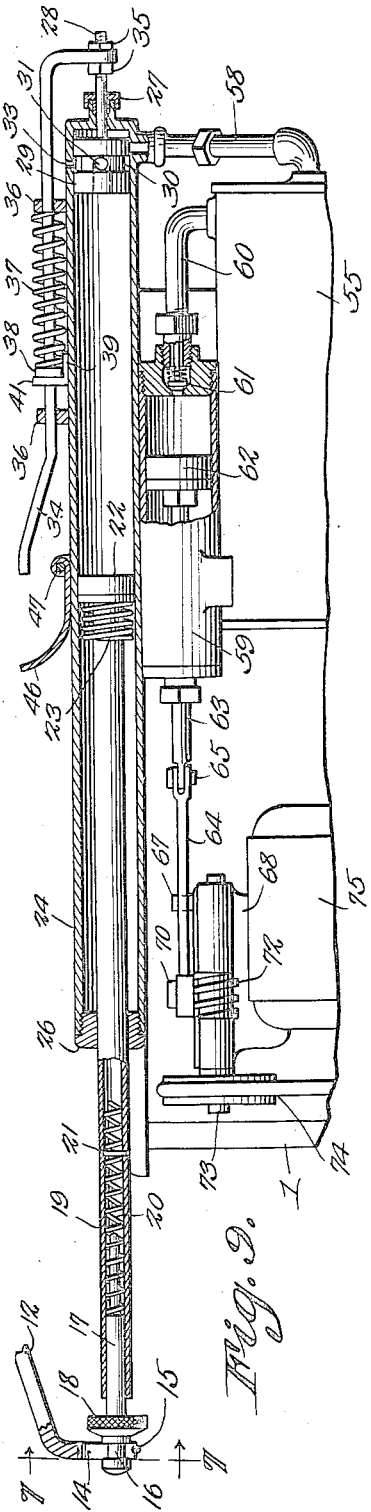
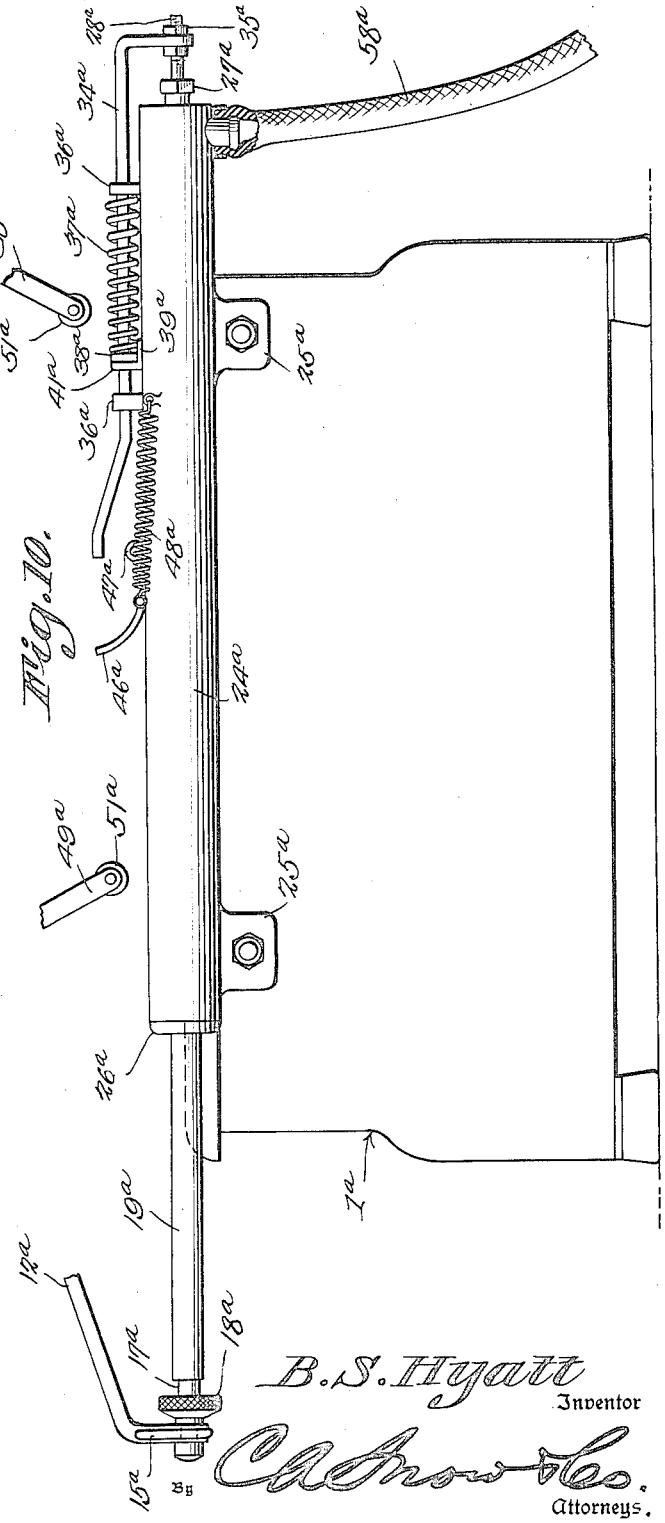
B. S. Hyatt
Inventor
Attorneys.

Patented Jan. 28, 1936

2,029,074

UNITED STATES PATENT OFFICE 2,029,074

ATTACHMENT FOR TYPEWRITERS

Benjamin S. Hyatt, Vinita, Okla., assignor of twenty-four and one-half per cent to W. A. Robbins, Tulsa, Okla., and twenty-four and one-half per cent to Bryan N. Wright, Arkansas City, Ark.

Application August 29, 1933, Serial No. 687,362

10 Claims. (Cl. 197—67)

One object of the present invention is to provide novel means whereby the carriage of a typewriter may be actuated automatically, by fluid pressure, to secure the return of the carriage. A further object of the invention is to provide novel means whereby back spacing may be brought about, in such a machine, at the will of an operator. Another object of the invention is to provide novel means for delivering air under pressure to the actuating cylinder which moves the carriage.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a rear elevation of the typewriter, with the device forming the subject matter of this application mounted thereon;

Fig. 3 is a rear elevation, wherein parts have been omitted, sundry movable members having been shifted slightly from the position of Fig. 2;

Fig. 4 is a transverse section on the line 4—4 of Fig. 2;

Fig. 5 is a transverse section on the line 5—5 of Fig. 2;

Fig. 6 is a fragmental vertical section on the line 6—6 of Fig. 4;

Fig. 7 is a fragmental transverse section on the line 7—7 of Fig. 9;

Fig. 8 is a fragmental top plan, parts being broken away, the view showing the device as it will appear at the time that the platen is actuated to raise the paper in the typewriter;

Fig. 9 is a longitudinal section through the pumping mechanism and the mechanism for moving the carriage responsive to fluid pressure;

Fig. 10 is a rear elevation illustrating a modification.

Figure 1:
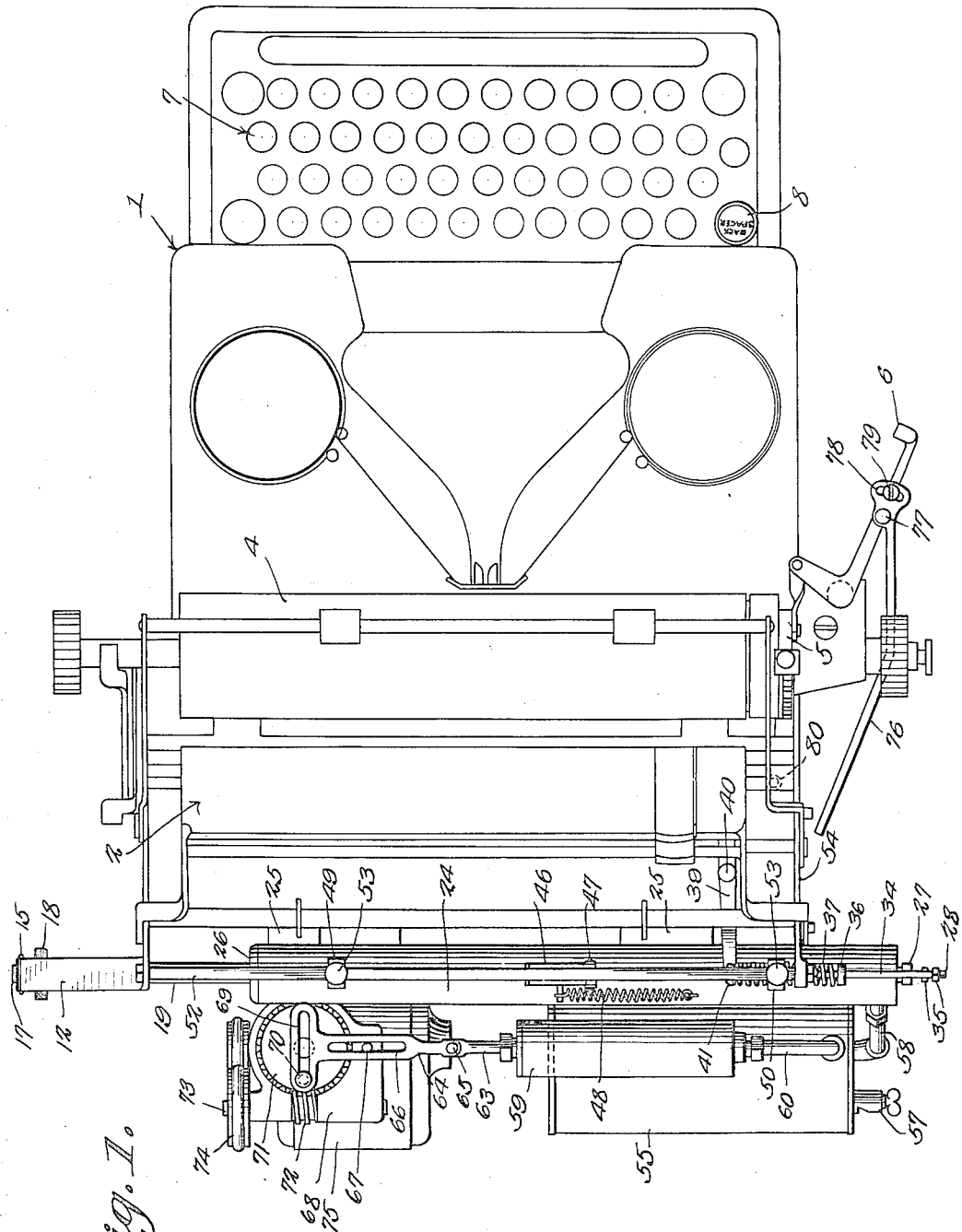
Fig. 1 shows, in top plan, a typewriter to which the device forming the subject matter of this application has been applied.

The device forming the subject matter of this application may be applied to typewriters of widely different sorts, but, by way of illustration, there is shown, in the drawings, a typewriter embodying a frame 1. A carriage 2 is mounted to reciprocate on the frame 1, and the feed mechanism for the carriage is marked by the numeral 3 in Fig. 4, the feed mechanism moving the carriage over, as letter after letter is struck, in a way well understood by everyone. A roller platen 4 is journaled for rotation on the carriage 2, the usual pawl and ratchet mechanism 5 of Fig. 1 being employed to rotate the platen 4 on the carriage 2, to shift up the paper, as line after line is typed. The platen-operating mechanism 5 includes a bell crank lever 6, fulcrumed on the carriage 2. The keys of the typewriter appear at 7 in Fig. 1. But one of the keys, namely the back-spacing key 8, need be considered in connection with the present application. The back-spacing key 8 (Fig. 4) forms part of a lever 9, fulcrumed intermediate its ends at 10 on the frame 1 of the typewriter. The key-carrying end of the lever 9 is raised by a pull spring 11, connected to the lever and to any accessible part of the frame 1.

It is with a typewriter of the kind hereinbefore briefly described, or with any other appropriately constructed typewriter, that the structure hereinafter set forth is adapted to be used.

Figures 3 and 1 show that a downwardly and outwardly extended offset bracket 12 is secured to one end of the carriage 2. In the lower end of the bracket 12 (Fig. 7) there is a slot 14. The lower end of the slot 14 is bridged across by a bail shaped, pivotally mounted latch 15, carried by the depending end of the bracket 12, Fig. 3 being compared with Fig. 7 at this point. It appears in Fig. 9 that the reduced part 16 of a horizontal guide pin 17 is mounted in the slot 14 of the bracket 12. The guide pin 17 carries a button 18, which is useful in making repairs and adjustments. With that observation, the button 18 may be dismissed from further consideration.

A hollow piston rod 19 has limited longitudinal movement on the guide pin 17. Within the hollow piston rod 19, a cushion spring 20 is located. One end of the cushion spring 20 engages an abutment 21 on the piston rod 19, and the opposite end of the spring engages the guide pin 17. A yieldable or cushioning connection thus is afforded, between the piston rod 19 and the bracket 12. It is by means of the piston rod 19 and the bracket 12 that the carriage 2 is operated, to return the carriage, after a line of any desired length has been typed.

The piston rod 19 carries a piston head 22, to which a compressive cushion spring 23 is attached, the spring 23 surrounding a portion of the piston rod 19. The piston head 22 slides in a cylinder 24, which is attached to the frame 1 of the typewriter by brackets 25, one of which is shown in Fig. 5.

The piston rod 19 of Fig. 9 slides in a head 26, secured in one end of the cylinder 24. On the opposite end of the cylinder 24 there is a gland 27, in which a rod 28 is mounted to reciprocate. The rod 28 carries a valve 29, which has, at times, a reciprocatory movement in the cylinder 24. The valve 29 has an external circumferential groove 30, and the valve is provided with a transverse passage 31, communicating at its ends with the groove 30. It appears in Fig. 3 that the valve 29 is provided with a longitudinal bore 32, communicating at its inner end with the transverse passage 31. An escape port 33 is located in the cylinder 24, in operative relation to the valve 29, as shown in Figs. 3 and 9.

An angular slide 34 (Figs. 2, 3, 6, 9 and 8) is located, for the most part, above the cylinder 24. The depending end of the slide 34 is adjustably secured, through the instrumentality of nuts 35 or the like, to the outer end of the rod 28 which carries the valve 29. The slide 34 is mounted for reciprocation in guides 36 on the cylinder 24.

A portion of the slide 34 is surrounded by a compression spring 37, one end of which engages the outermost guide 36, and the opposite end of which engages an abutment 38, which is fixed to the slide 34. The function of the spring 37 is to carry the slide 34, the rod 28 and the valve 29 to the left, from the position of Fig. 3 to the position of Fig. 9.

A lever 39, shown in Fig. 8 and elsewhere, is fulcrumed at 40, intermediate its ends, on the frame 1 of the typewriter. At its rear end, the lever 39 has an upstanding wing 41 (Fig. 6) which is adapted to bear against the fixed abutment 38 on the slide 34. A link 42 (Figs. 6 and 8) is pivoted at one end to the lever 39, and at its opposite end to the upstanding end of a bell crank lever 43, which is fulcrumed at 44 on the frame 1 of the typewriter. The lateral arm of the bell crank lever 43 is pivoted to a depending link 45 which, as disclosed in Fig. 4, is pivoted to the inner end of the back-spacing key lever 9.

Passing to Figs. 3 and 2, the reader will note that a curved operating member 46, in the form of a radius arm, is hingedly mounted at its lower end, as shown at 47, on the cylinder 24. Figure 3, especially, makes it evident that the operating member 46 is adapted to engage and actuate the slide 34. A pull spring 48 is connected at one end to the operating member 46, and at its opposite end to the cylinder 24. The connections between the ends of the pull spring 48 and the operating member 46 and the cylinder 24 are so located with respect to the hinged mounting 47 of the operating member 46 that when the operating member is turned down against the cylinder 24, as in Fig. 2, the spring 48 will have a tendency to keep the operating member in that position; but when the operating member 46 is raised a little by a mechanism later to be described, and represented sufficiently at this point of the description by the member 49 of Fig. 3, then the spring 48 has a tendency to swing the operating member to the right in Fig. 3 and cause the operating member to actuate the slide 34. The spring 48 is stronger than the spring 37.

The actuating members for the operating element 46 embody the member 49 of Fig. 3, hereinbefore alluded to, and another operating member, marked by the numeral 50. The actuating members 49 and 50 have anti-friction wheels 51 at their lower ends, for engagement with the operating member or radius arm 46. The actuating members 49 and 50 have horizontal adjustment on a guide rod 52, but they are held in fixed position on the guide rod 52, by set screws 53 threaded into the members 49 and 50 and adapted to engage the guide rod. Figures 3 and 1 show that one end of the guide rod 52 is secured to the carriage 2, in that the said end of the guide rod is secured in the bracket 12 on the carriage. The opposite end of the guide rod 52 is secured to the carriage 2 by a bracket 54 (Figs. 8, 1 and 3).

The pressure tank 55 of Fig. 3 is secured by the brackets 56 of Fig. 5 to the frame 1 of the typewriter. At one end, the pressure tank 55 is supplied with a hand valve 57 (Fig. 1), by means of which the pressure can be let out of the tank, upon occasion. A pipe 58 (Figs. 9 and 2) is joined at one end to the pressure tank 55, and at its opposite end to the cylinder 24, in operative relation to the valve 29.

A pump cylinder 59 (Figs. 9 and 3) is secured to the top of the tank 55. One end of the pump cylinder 59 is connected by a pipe 60 to the tank 55. In the pump cylinder 59 is mounted an inwardly closing check valve 61 (Fig. 9) controlling and stopping the back flow of pressure from the tank 55 into the pump cylinder 59, the valve 61 opening to permit pressure to pass from the pump cylinder into the tank, through the pipe 60. A piston 62 is slidably mounted in the pump cylinder 59 and is secured to a piston rod 63, mounted to reciprocate in the end of the pump cylinder.

Referring to Figs. 3 and 1, a T-shaped pitman 64 is pivoted at 65 to the piston rod 63. In the longitudinal shank of the pitman 64 there is an elongated slot 66, whereby the pitman is guided on a pin 67, carried by a bearing bracket 68, projecting rearwardly from the frame 1 of the typewriter. An elongated transverse slot 69 (Fig. 1) is formed in the transverse head of the pitman 64.

A crank pin 70 operates in the slot 69 and is secured to a worm wheel 71, shown in Fig. 1, the worm wheel being journaled in the bearing bracket 68. The worm wheel 71 meshes with a worm 72 (compare Figs. 1 and 3) secured to a shaft 73 which is journaled for rotation in the bearing bracket 68. A belt drive 74 connects the outer end of the shaft 73 with a motor 75, preferably an electric motor, mounted on the back part of the typewriter frame 1.

As shown in Figs. 1 and 8, an arm 76 is pivoted for adjustment at 77, intermediate its ends, on the back-spacing lever 6, the forward segment of the arm being much shorter than the rear segment thereof. A transverse slot 78 is formed in the forward segment of the arm 76 and receives a set screw 79, threaded into the line spacing lever 6, and adapted to hold the arm 76 at adjusted angles with regard to the line spacing lever. The arm 76 extends downwardly and rearwardly (Fig. 4), and the rear end of the arm is adapted to engage a projection 80 on the typewriter frame 1, the projection appearing in Figs. 8, 6 and 4.

As to the supply of air under pressure for the cylinder 24, delivered through the pipe 58, it may be stated that the motor 75 of Fig. 2 rotates the shaft 73 by way of the belt drive 74. The worm 72 on the shaft 73 rotates the worm wheel 70 of Fig. 1, and the pitman 64 operates the rod 63 and the piston 62 of Fig. 9, air being forced into the tank 55 through the pipe 60, past the check valve 61, the air under pressure being delivered from the tank 55 to the cylinder 24 through the pipe 58.

If desired, the tank 55, the pump 59, the motor 75 and parts associated therewith may be omitted, as shown in Fig. 10. In Fig. 10, parts hereinbefore described have been designated by numerals previously used with the suffix "a". In this form of the invention, the air under pressure is supplied to the pump cylinder 24a through the pipe 58a which transmits pressure from any suitable source (not shown).

Suppose that the typing operation is going on, and that the carriage 2 is moving to the right, viewed from the back of the machine, as in Figs. 2 and 9. Then the parts are arranged as shown in those figures. The radius arm 46 is held down on top of the cylinder 24 by the spring 48, in the path of the actuating member 49. The spring 37 of Fig. 9 has carried the slide 34, the rod 28 and the valve 29 to the left in that figure, until the valve 29 covers the mouth of the pipe 58, so that no pressure can pass from the tank 55 into the cylinder 24. The circumferential groove 30 of the valve 29 is in registration with the escape port 33 in the cylinder 24. As the carriage 2 moves to the right, it carries the piston head 22 to the right by a train of parts comprising the piston rod 19, the spring 20, the guide pin 17 and the bracket 12. As the piston head 22 moves to the right in Fig. 9, the air head of the part 22 can escape through the longitudinal bore 32 of the valve 29, the transverse passage 31, the circumferential groove 30, and the port 33, the carriage 2 thus being permitted to move freely to the right in Fig. 9, without being impeded by back pressure.

A time ultimately arrives when, as the carriage moves to the right in Fig. 3, the actuating member 49 engages the radius arm 46 and raises it to the dotted line position of Fig. 3, more or less. In any event, when the radius arm 46 is raised far enough, so that the pull spring 48 of Fig. 2 is above the hinged mounting 47 of the radius arm, the spring 48 then acts to raise the radius arm 46 into the solid line position of Fig. 3. As the radius arm 46 is raised into the solid line position of Fig. 3, it engages the slide 34 and moves the slide 34 to the right, the spring 48 overcoming the spring 37. As the slide 34 moves to the right, it carries the rod 28 and the valve 29 with it, the valve arriving in the position shown in Fig. 3. Under such circumstances, the circumferential groove 30 of the valve 29 is in communication with the mouth of the pipe 58, and air can flow through the pipe 58, into the groove 30, and from thence into the transverse passage 31 of the valve 29, the air under pressure entering the cylinder 24 through the longitudinal bore 32. The piston head 22 of Fig. 9 now is carried to the left, together with all parts connected to it, including the carriage 2, and the carriage is returned, to the beginning of a new line. The radius arm 46 is in the upstanding position of Fig. 3, and the time comes when the actuating member 50 engages the upstanding radius arm and throws it backwardly and downwardly into the position of Fig. 2, the spring 48 holding it in that position. When the radius arm 46 is clear of the slide 34, the spring 37 re-asserts itself and moves the slide 34, the rod 28 and the valve 29 back into the position of Fig. 9, which cuts off the supply of fluid pressure from the pipe 58.

From the foregoing it will be understood that the carriage 2 is given an automatic return, without attention on the part of the operator. The purpose of the spring 20 is to afford a cushioning effect when the guide pin 17 starts to move to the right. The spring 23, cooperating with the cylinder head 26, has a cushioning effect as the piston head 22 and the piston rod 19 moves to the left.

Although the device operates automatically, as hereinbefore described, it is not beyond the control of the typist. A typist can tap lightly on the key 8 of Fig. 4, tilting the back spacing lever 9 on its fulcrum 10, the link 45 imparting movement to the bell crank lever 43 of Fig. 6, and the bell crank lever 46 acting through the link 42 of Fig. 8 to tilt the lever 39 on its fulcrum 40. As the lever 39 is tilted on its fulcrum 40, the wing 41 of the lever, cooperating with the abutment 38 on the slide 34, imparts movement to the rod 28 and the valve 29, the valve 29 being moved from the position of Fig. 9 toward the position of Fig. 3, thereby opening the mouth of the fluid pressure inlet pipe 58 a little, and letting into the cylinder 24, small puffs of air, which will carry the piston head 22, the bracket 12 and the carriage 2 to the left a little, thereby effecting a back spacing, without causing the carriage 2 to make a complete back stroke.

Noting Fig. 8 of the drawings, it will be seen that as the carriage makes its back stroke, the arm 76 on the platen actuating lever 6 ultimately comes into contact with the projection 80 on the typewriter frame 1. The platen actuating lever 6 thus is tilted, and the mechanism shown at 5 will rotate the platen 4 by the usual step, to turn up the paper a predetermined amount. The necessary adjustment of the arm 76 may be obtained by loosening the set screw 79, swinging the arm 76 on its pivot 77, and tightening the set screw 79.

Having thus described the invention, what is claimed is:

1. In a device of the class described, a typewriter comprising a frame, a carriage movable on the frame, a cylinder carried by the frame, a piston operating in the cylinder, means for connecting the piston with the carriage to secure a return movement of the carriage, a source of fluid pressure supply having an inlet communicating with the cylinder, a valve slidable in the cylinder and governing the inlet, and means operated by the carriage during its advancing movement, for actuating the valve to admit fluid pressure to the cylinder and bring about said return movement of the carriage.

2. In a device of the class described, a typewriter comprising a frame, a carriage movable on the frame, a cylinder carried by the frame, a piston operating in the cylinder, means for connecting the piston with the carriage to secure a return movement of the carriage, a source of fluid pressure supply having an inlet communicating with the cylinder, a valve slidable in the cylinder and governing the inlet, means operated by the carriage during its advancing movement, for actuating the valve to admit fluid pressure to the cylinder and bring about said return movement of the carriage, the cylinder having an escape port, the valve having a circumferential groove which communicates with the inlet when the valve is in one position, the groove communicating with the escape port when the valve is in another position, and the valve having a conduit communicating with the groove and with the space between the valve and the piston.

3. In a device of the class described, a typewriter comprising a frame, a carriage movable on the frame, mechanism operated by fluid pressure and connected to the carriage for imparting a return movement to the carriage, a valve controlling the admission of fluid pressure to said mechanism, to secure a return of the carriage, operating means for the valve, spaced actuating members on the carriage, one of the actuating members coacting with the operating means for the valve to actuate the valve and admit pressure to said mechanism, during the advancing movement of the carriage, the other of said actuating members cooperating with the operating means for the valve to cut off the fluid pressure during said return movement of the carriage, the operating means for the valve embodying a radius arm, means for mounting the radius arm for swinging movement, said means comprising a hinge for the radius arm, a slide connected to the valve and disposed in the path of the radius arm, the radius arm constituting means for moving the slide in one direction, a first spring means for moving the slide in an opposite direction, as the radius arm retires from the slide, means for stopping the movement of the radius arm as the radius arm retires from the slide, a second spring means, stronger than the first spring means, and connected at one end to the radius arm, an anchorage for the opposite end of the second spring means, the anchorage being so located that when the second spring means exerts a pull on one side of the hinge, the radius arm will be held in engagement with said stopping means, the anchorage being so located so that when the second spring means is on the opposite side of the hinge, the second spring means will actuate the radius arm and cause the radius arm to operate the slide in the said one direction.

4. In a device of the class described, a typewriter comprising a frame, a carriage movable on the frame, a cylinder on the frame, and a piston slidable in the cylinder, the piston being connected to the carriage, the cylinder and the piston constituting mechanism operated by fluid pressure for imparting a return movement to the carriage, a valve in the said cylinder and controlling the admission of fluid pressure to the cylinder, to secure a return of the carriage, spaced actuating members on the carriage, a radius arm pivotally mounted on the cylinder and located between the actuating members, a slide connected to the valve and disposed in the path of the radius arm, the slide being mounted to reciprocate on the cylinder, the radius arm constituting means for moving the slide in one direction, spring means for moving the slide in an opposite direction, as the radius arm retires from the slide, a back spacing key, and a connection between the back spacing key and the slide and extended part way across the cylinder, transversely of the cyinder, the connection constituting means whereby the slide and the valve may be actuated at the will of an operator to admit small quantities of fluid pressure to the cylinder, thereby to effect a back spacing.

5. In a device of the class described, a typewriter comprising a frame, a carriage movable upon the frame, a cylinder carried by the frame, a piston operating in the cylinder and having a hollow rod, an internal abutment carried by the rod, a guide pin having its inner end slidable in the rod, the guide pin being provided at its outer end with a circumscribing groove defining a reduced part in the guide pin, a compression spring housed within the rod and interposed between the abutment and the guide pin, a bracket secured to the carriage and provided with a slot which opens through one end of the bracket, the reduced part of the guide pin being received in the slot, and a latch movably mounted on the bracket and extending across the slot, to hold the bracket and the guide pin releasably assembled when the bracket is detached from the carriage.

6. In a device of the class described, a typewriter comprising a frame, a carriage movable upon the frame, a cylinder carried by the frame and provided with a head, a piston operating in the cylinder and including a hollow rod slidable in the head and having an internal abutment, a guide pin slidable in the rod, a compression spring housed within the rod and engaged between the guide pin and the abutment, means for connecting the guide pin with the carriage to secure a return movement of the carriage, means operated by the carriage during its advancing movement, for admitting fluid pressure to the cylinder, to secure said return movement of the carriage, and a compression spring within the cylinder and surrounding the rod, the last-specified compression spring being secured at one end to the piston, the opposite end of the last-specified spring being spaced from the head, but being adapted to engage the head, to serve as a cushion, as the carriage makes its return movement.

7. In a device of the class described, a typewriter comprising a frame, a carriage movable on the frame, mechanism operated by fluid pressure for imparting a return movement to the carriage, said mechanism comprising a cylinder on the frame and having an inlet, a piston slidable in the cylinder and connected to the carriage, a valve slidable in said cylinder and controlling the inlet, to secure a return of the carriage, operating means for the valve, mounted on the cylinder, spaced actuating members, means for mounting the actuating members for adjustment longitudinally of the carriage, one of the actuating members coacting with the operating means for the valve to actuate the valve and admit pressure through the inlet during the advancing movement of the carriage, the other of said actuating members cooperating with the operating means for the valve, to cut off fluid pressure through the inlet during said return movement of the carriage, and means for holding the actuating members in adjusted positions, longitudinally of the carriage, and with respect to the operating means for the valve.

8. In a device of the class described, a typewriter comprising a frame, a carriage movable on the frame, mechanism operating by fluid pressure for imparting a return movement to the carriage, said mechanism comprising a cylinder on the frame and having an inlet, a piston slidable in the cylinder and connected to the carriage, a valve slidable in said cylinder and controlling the inlet, to secure a return of the carriage, operating means for the valve, including a radius arm hingedly mounted on the cylinder, and a slide mounted to reciprocate on the cylinder and connected to the valve, the slide being disposed in the path of the radius arm, the radius arm constituting means for moving the slide in one direction, spring means for moving the slide in an opposite direction, as the radius arm retires from the slide, spaced actuating members disposed on opposite sides of the radius arm, means for mounting the actuating members for adjustment longitudinally of the carriage, one of the actuating members coacting with the radius arm to actuate the slide and the valve and admit pressure through the inlet during the advancing movement of the carriage, the other of said actuating members cooperating with the radius arm and the slide to permit the cutting off of fluid pressure through the inlet during the return movement of the carriage, and means for holding the actuating members in adjusted positions, longitudinally of the carriage, and with respect to the radius arm.

9. In a device of the class described, a typewriter comprising a frame, a carriage movable on the frame, mechanism operated by fluid pressure for imparting a return movement to the carriage, said mechanism comprising a cylinder on the frame and having an inlet, a piston slidable in the cylinder and connected to the carriage, a valve slidable in said cylinder and controlling the inlet, to secure a return of the carriage, operating means for the valve, means on the carriage and coacting with the operating means for the valve to actuate the valve and admit pressure through the inlet during the advancing movement of the carriage, means on the carriage and coacting with the operating means for the valve, to cut off fluid pressure through the inlet during the return movement of the carriage, a back-spacing key on the frame, and means for connecting the key operatively with the valve and to shift the valve with respect to the inlet of the cylinder, thereby to admit small quantities of fluid pressure, and to effect a back spacing.

10. In a device of the class described, a typewriter comprising a frame, a carriage movable on the frame, mechanism operated by fluid pressure for imparting a return movement to the carriage, a valve controlling the admission of fluid pressure to said mechanism, to secure a return movement of the carriage, a part on the carriage and cooperating with the valve to open the valve, admit fluid pressure to said mechanism and initiate the return movement of the carriage, a platen journaled on the carriage, mechanism on the carriage for rotating the platen, the last-specified mechanism embodying a movable line-spacing member on the carriage, an arm, a projection on the frame, wherewith the arm engages, and means for mounting the arm on the line-spacing member for adjustment, to vary the position of the arm with respect to the projection and with respect to said part on the carriage, thereby to bring about the line-spacing in consonance with the initiation of the return movement of the carriage, and in properly timed relation to the opening of the valve.

BENJAMIN S. HYATT.